United States Patent
Kosaki et al.

(10) Patent No.: US 10,411,315 B2
(45) Date of Patent: Sep. 10, 2019

(54) BATTERY PACK STRUCTURE INCLUDING COOLING DUCT OUTSIDE PACK CASE CONNECTED TO CHAMBER INSIDE PACK CASE BY CONNECTOR AND FIRST AND SECOND SEALING MEMBERS

(71) Applicant: TOYOTA JIDOSHA KABUSHIKI KAISHA, Toyota-shi, Aichi-ken (JP)

(72) Inventors: Akihiro Kosaki, Aichi-ken (JP);
Kouichi Tanaka, Okazaki (JP);
Takenori Kobayashi, Toyota (JP);
Shigeru Fukuda, Nagoya (JP);
Toshiaki Naruke, Toyota (JP); Akira Azumi, Kiyosu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 25 days.

(21) Appl. No.: 15/629,138

(22) Filed: Jun. 21, 2017

(65) Prior Publication Data
US 2017/0373361 A1 Dec. 28, 2017

(30) Foreign Application Priority Data
Jun. 24, 2016 (JP) .................................. 2016-125638

(51) Int. Cl.
*H01M 10/6562* (2014.01)
*H01M 10/613* (2014.01)
(Continued)

(52) U.S. Cl.
CPC ..... *H01M 10/6562* (2015.04); *H01M 10/613* (2015.04); *H01M 10/6566* (2015.04);
(Continued)

(58) Field of Classification Search
CPC ........... H01M 10/6562; H01M 10/613; H01M 10/625
(Continued)

(56) References Cited

U.S. PATENT DOCUMENTS

| 5,215,834 A | 6/1993 | Reher et al. |
| 2009/0173471 A1* | 7/2009 | Sakamoto .......... B60H 1/00278 165/41 |

(Continued)

FOREIGN PATENT DOCUMENTS

| JP | 2015118823 A | 6/2015 |
| JP | 2015-158979 A | 9/2015 |

(Continued)

*Primary Examiner* — Sean P Cullen
(74) *Attorney, Agent, or Firm* — Sughrue Mion, PLLC

(57) ABSTRACT

A battery pack structure includes a chamber, a cooling duct arranged outside the pack case, and a connector that communicates the chamber and the cooling duct with each other. The connector includes a first opening, which is connected with the chamber in a state of being sealed by a first sealing member, a second opening, which is connected with a cooling duct in a state of being sealed by a second sealing member, a first sealing surface, which is formed in a peripheral part of the first opening and is either a tube-shaped surface or a plane that faces a chamber inlet surface though the first sealing member, and a second sealing surface, which is formed in a peripheral part of the second opening and is a tube-shaped surface or a plane that faces a duct outlet surface through the second sealing member.

2 Claims, 11 Drawing Sheets

(51) Int. Cl.
  *H01M 10/6566* (2014.01)
  *H01M 10/617* (2014.01)
  *H01M 10/625* (2014.01)
  *H01M 10/39* (2006.01)
  *H01M 10/6563* (2014.01)

(52) U.S. Cl.
  CPC ...... *H01M 10/3963* (2013.01); *H01M 10/617* (2015.04); *H01M 10/625* (2015.04); *H01M 10/6563* (2015.04)

(58) Field of Classification Search
  USPC .................................................. 429/120, 156
  See application file for complete search history.

(56) References Cited

U.S. PATENT DOCUMENTS

| | | | |
|---|---|---|---|
| 2010/0099019 A1* | 4/2010 | Nagata | B60K 1/04 429/120 |
| 2013/0000864 A1* | 1/2013 | Yamatani | B60K 1/04 165/59 |
| 2015/0343891 A1* | 12/2015 | Honda | B60K 1/04 180/68.1 |
| 2015/0380781 A1 | 12/2015 | Steinmeyer et al. | |
| 2016/0211560 A1* | 7/2016 | Hara | H01M 2/1077 |
| 2016/0211561 A1* | 7/2016 | Nakagawa | H01M 2/1077 |

FOREIGN PATENT DOCUMENTS

| | | |
|---|---|---|
| KR | 10-2012-0025605 A | 3/2012 |
| KR | 10-2014-0147978 A | 12/2014 |
| WO | 2011007501 A1 | 1/2011 |

* cited by examiner

BATTERY PACK STRUCTURE INCLUDING COOLING DUCT OUTSIDE PACK CASE CONNECTED TO CHAMBER INSIDE PACK CASE BY CONNECTOR AND FIRST AND SECOND SEALING MEMBERS

INCORPORATION BY REFERENCE

The disclosure of Japanese Patent Application No. 2016-125638 filed on Jun. 24, 2016 including the specification, drawings and abstract is incorporated herein by reference in its entirety.

BACKGROUND

1. Technical Field

The disclosure relates to a battery pack structure, which includes a chamber that forms an air flow passage inside a pack case for housing a battery module, and a cooling duct that forms an air flow passage outside the pack case.

2. Description of Related Art

In a vehicle like an electric automobile or a hybrid vehicle, in which an electric motor for driving the vehicle is mounted, a battery pack that supplies electric power to the electric motor is also mounted. The battery pack is made of a plurality of battery modules, and each of the battery modules is formed by electrically connecting a plurality of battery cells. The battery modules are arranged inside a pack case that serves as a battery pack case, and a cooling duct arranged outside the pack case is connected with the pack case. As air inside a cabin and so on is sent into the battery pack case from the cooling duct, the battery modules are cooled.

In Japanese Patent Application Publication No. 2015-158979 (JP 2015-158979 A), a configuration is described in which an end part of a suction duct serving as a cooling duct is inserted in an insertion hole of a housing case serving as a pack case, and a chamber serving as an air flow passage is attached to a side surface part of a cell cover of a battery module. The end part of the suction duct is connected with the chamber inside the housing case.

SUMMARY

In the configuration described in JP 2015-158979 A, the cooling duct and the chamber are connected with each other. In a case where the cooling duct and the chamber are connected with each other directly, when at least one of the cooling duct and the chamber has large variation in shape or assembly, a large gap can be created in a connected part of the cooling duct and the chamber. For example, a gap can be made when the two parts are separated from each other in fitted portions of the two parts, or when the two parts are fitted to each other obliquely. When a gap is made in this way, leakage of cooling air can happen in the connected part. Because of this, cooling performance of the battery pack structure can deteriorate. Then, deterioration of the cooling performance can result in a decrease in output and life of the battery.

According to the disclosure, in a battery pack structure in which a cooling duct outside a pack case and a chamber inside the pack case are connected with each other, deterioration of cooling performance is restrained even when the cooling duct and the chamber have large variation in shape or assembly.

A battery pack structure according to an aspect of the disclosure is provided with a battery module including a plurality of battery cells, a pack case in which a plurality of the battery modules are housed, a chamber that serves as an air flow passage to the battery module inside the pack case, a cooling duct that is arranged outside the pack case and serves as an air flow passage, and a connector that connects the cooling duct and the pack case with each other, and communicates the chamber and the cooling duct with each other as an air flow passage. The connector includes a first opening, a second opening, a first sealing surface, and a second sealing surface. The first opening is connected with an inlet part of the chamber in a state of being sealed by a first sealing member. The second opening is connected with an outlet part of the cooling duct in a state of being sealed by a second sealing member. The first sealing surface is formed in a peripheral part of the first opening. The first sealing surface faces a chamber inlet surface through the first sealing member. The first sealing surface is one of a tube-shaped surface and a plane. The chamber inlet surface is formed in a peripheral part of the inlet part. The chamber inlet surface is one of a tube-shaped surface and a plane. The second sealing surface is formed in a peripheral part of the second opening. The second sealing surface faces a duct outlet surface through the second sealing member. The second sealing surface is one of a tube-shaped surface and a plane. The duct outlet surface is formed in a peripheral part of the outlet part. The duct outlet surface is one of a tube-shaped surface and a plane.

According to the battery pack structure stated above, even when the cooling duct and the chamber have large variation in shape or assembly, the first sealing member and the second sealing member arranged in the peripheral parts of the first opening and the second opening of the connector, respectively, are able to absorb the variation. Thus, in a configuration in which the cooling duct and the chamber are connected with each other, even when the cooling duct and the chamber have large variation in shape or assembly, it is possible to restrain deterioration of cooling performance.

Further, in the foregoing battery pack structure, one of the first sealing surface and the second sealing surface may be the tube-shaped surface. The other one of the first sealing surface and the second sealing surface may be the plane. The other one of the first sealing surface and the second sealing surface may be orthogonal to an axis direction of the tube that is made by the one of the first sealing surface and the second sealing surface.

According to the foregoing configuration, even when the cooling duct and the chamber have large variation in a first direction, which is parallel to an axis direction of one of the sealing surfaces, and in a second direction, which is parallel to the other sealing surface, it is possible to absorb variation in these two directions. This makes it possible to restrain deterioration of cooling performance.

In the foregoing battery pack structure according to the aspect of the disclosure, in which the cooling duct and the chamber are connected with each other, it is possible to restrain deterioration of cooling performance even when the cooling duct and the chamber have large variation in shape or assembly.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
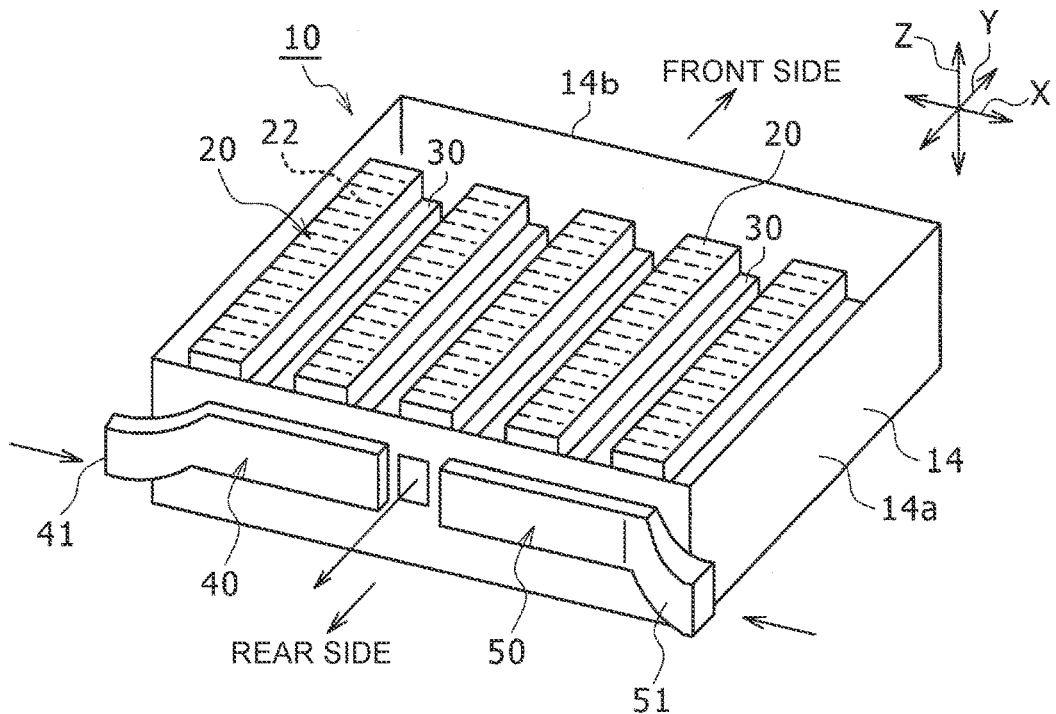
FIG. 1 is a perspective view of a battery pack structure according to the first embodiment of the disclosure, in which a lid part is removed.

Herein below, a battery pack, which is an embodiment of a battery pack structure according to the disclosure, is explained in detail. Shapes, numbers, materials and so on explained below are just examples for the explanation, and changes may be made depending on specifications of the battery pack. Although the explanation below pertains to a case where a battery pack is mounted on a vehicle, a battery pack is not limited to a configuration for such a purpose only, and may also be used for different proposes, for example, for homes and factories. In the explanation below, the same reference numerals are used for similar components.

Figure 2:
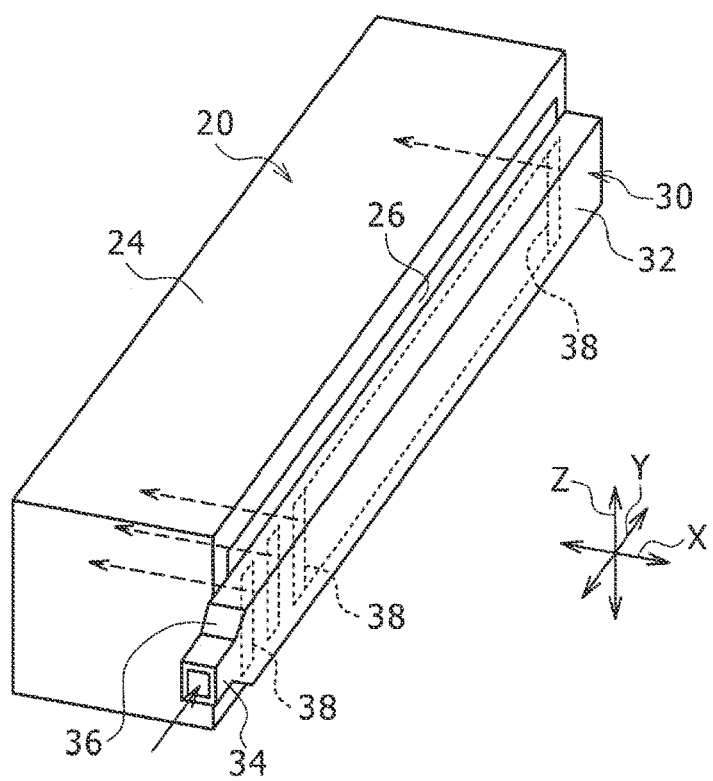
FIG. 2 is a perspective view of a battery module and a chamber taken out from FIG. 1.
Figure 3:
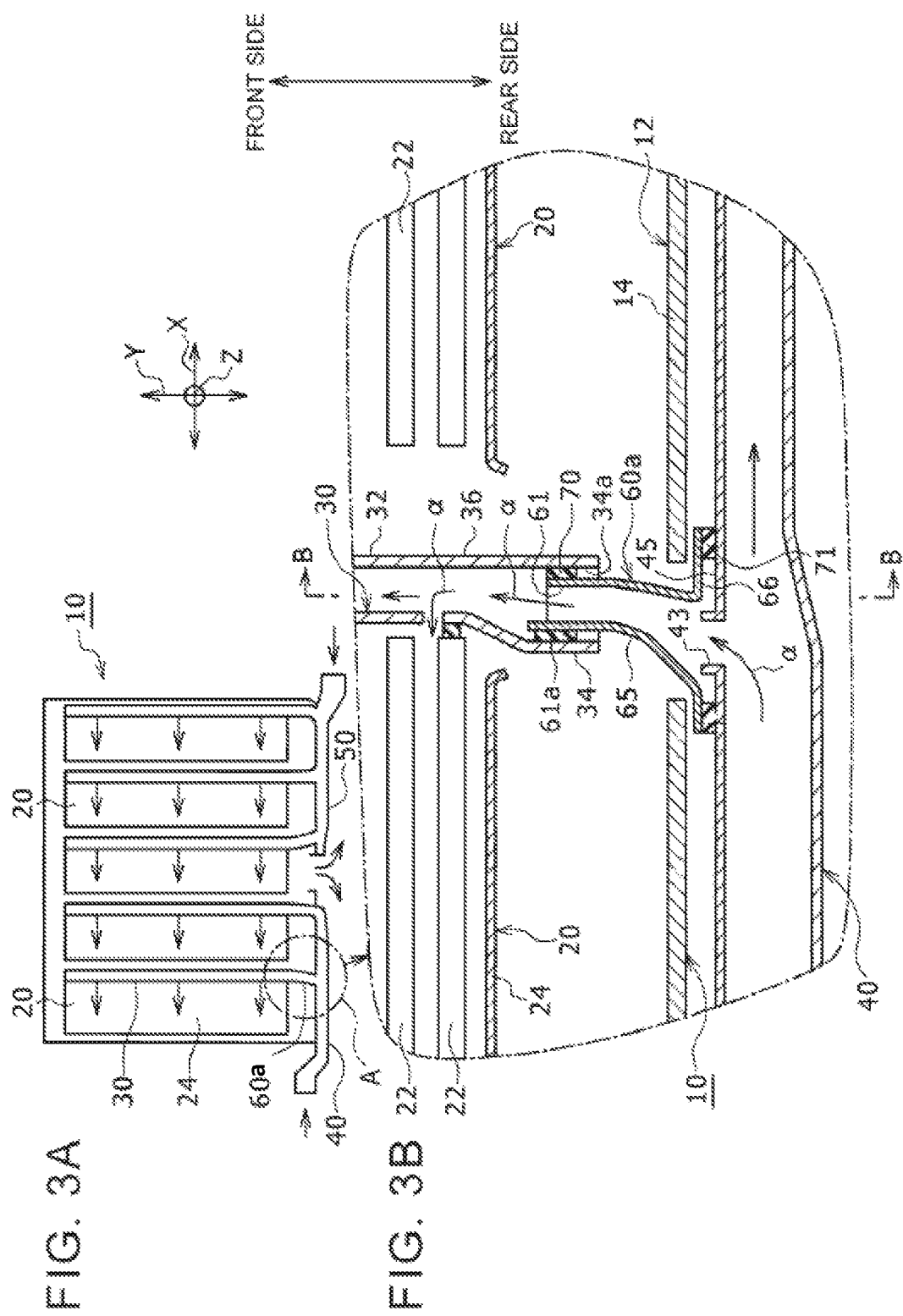
FIG. 3A is a sectional view of the battery pack structure shown in FIG. 1.
FIG. 3B is an enlarged view of a portion A of the sectional view of the battery pack structure shown in FIG. 3A.

FIG. 1 is a perspective view of a battery pack 10 according to the first embodiment, in which a lid part 16 (see FIG. 5) is removed. FIG. 2 is a perspective view of one of battery modules 20 and one of chambers 30 removed from FIG. 1. FIG. 3A is a schematic plan view explaining flows of air in the battery pack 10, and FIG. 3B is an enlarged view showing a sectional configuration of a portion A in FIG. 3A.

Figure 4:
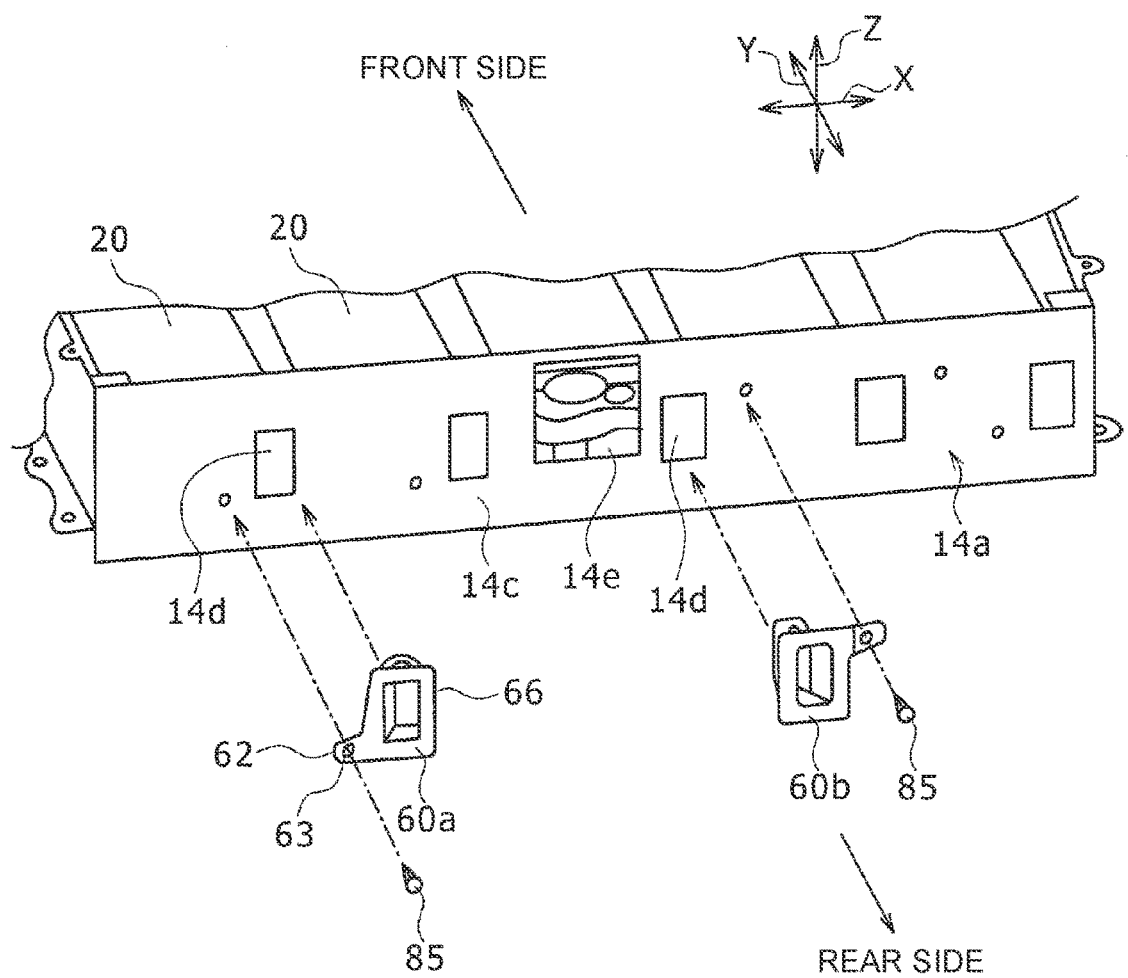
FIG. 4 is a perspective view in which cooling ducts and a second wall part of a case body are removed from FIG. 1, and a cover part of the case body and connectors are separated from one another.

The battery pack 10 includes a pack case 12 (FIG. 5) serving as a case for the battery pack 10, the plurality of battery modules 20, the plurality of chambers 30, a first cooling duct 40, a second cooling duct 50, and a plurality of connectors 60a, 60b (FIG. 3A, FIG. 3B, FIG. 4).

The pack case 12 includes a box-shaped case body 14 (FIG. 1) having an opening in an upper end, and the lid part 16 (see FIG. 5) fixed to the case body 14 so as to close the opening of the case body 14.

The plurality of battery modules 20 are housed inside the pack case 12 and arranged in an array in a left-right direction. Each of the battery modules 20 has a block shape extending in a front-rear direction Y. In FIG. 1 to FIG. 6 and FIG. 9, the left-right direction is shown as X, the front-rear direction orthogonal to the left-right direction X is shown as Y, and an upper-lower direction orthogonal to X and Y is shown as Z. The battery pack 10 is mounted, for example, behind a rear seat of a vehicle and is used as a power source for a traction motor (not shown) mounted on the vehicle. Then, the pack case 12 is fixed to a rear part of the vehicle body. The front-rear direction Y, the left-right direction X, and the upper-lower direction Z coincide with a front-rear direction, a left-right direction, and an upper-lower direction of a vehicle, respectively.

The case body 14 and the lid part 16 are made of metal such as iron. In FIG. 1, the case body 14 is schematically shown in a box shape. The case body 14 includes a first wall part 14a that continuously covers rear sides and both left and right sides of the plurality of battery modules 20, a bottom plate part (not shown), and a second wall part 14b that covers front sides of the plurality of battery modules 20. The bottom plate part is fixed to the first wall part 14a, covering an opening at the bottom of the first wall part 14a. The second wall part 14b is fixed to the first wall part 14a, covering an opening of a front end of the first wall part 14a.

FIG. 4 is a perspective view in which the cooling ducts 40, 50 and the second wall part 14b of the case body 14 are removed from FIG. 1, and the first wall part 14a of the case body and the connectors 60a, 60b are separated from one another. As shown in FIG. 4, in a rear end wall part 14c arranged in a rear end of the first wall part 14a, connector insertion holes 14d are formed at a plurality of positions that are separated from each other in the left-right direction X. Each of the connector insertion holes 14d is formed so as to open between neighboring battery modules 20 among the plurality of battery modules 20. One of the later-described connectors 60a, 60b is inserted and attached to each of the connector insertion holes 14d. In FIG. 4, in order to simplify the drawing, inside of the connector insertion holes 14d is plain so that the back sides of the connector insertion holes 14d cannot be seen.

Inside the case body 14, the chamber 30 is arranged between the neighboring battery modules 20. The chamber 30 is connected with the battery module 20, and serves as an air flow passage to the battery module 20 and a distribution part that distributes and supplies cooling air to the battery module 20. Then, outlet parts of the later-described first cooling duct 40 and second cooling duct 50 are connected with second openings of the connectors 60a, 60b through second sealing members, respectively, and first openings of the connectors 60a, 60b are connected with inlet parts of the chambers 30 through first sealing members, respectively. Thus, as described later, cooling air is supplied to the battery modules 20 from upstream sides of the cooling ducts 40, 50 through the cooling ducts 40, 50, the connectors 60a, 60b, and the chambers 30. Further, as described later, in the configuration in which the cooling ducts 40, 50 and the chambers 30 are connected with each other, it is possible to restrain deterioration of cooling performance of the battery pack 10 even when the cooling ducts 40, 50 and the chambers 30 have large variation in shape or assembly.

Further, in the rear end wall part 14c of the first wall part 14a, an exhaust hole 14e is formed at a central position in the left-right direction X. Air that flows inside the pack case 12 is discharged outside the pack case 12 through the exhaust hole 14e.

The battery modules 20 are fixed to an upper side of the bottom plate part of the pack case 12 by using, for example, bolts (not shown). With reference to FIG. 3A, each of the battery modules 20 includes a plurality of battery cells 22, and the plurality of battery cells 22 are arranged in an array in the front-rear direction Y and fixed to a module case 24. Thus, the array direction of the battery cells 22 coincides with the front-rear direction Y. The plurality of battery cells 22 are electrically connected with one another.

The battery cells 22 are rectangular secondary cells such as lithium ion secondary cells or nickel hydrogen secondary cells. The battery cells may also be cylindrical secondary cells.

As shown in FIG. 2, the module case 24 of the battery module 20 has openings 26 on both end surfaces in the left-right direction X. In FIG. 2, the opening 26 on the right side is shown, and the opening on the left side is now shown. However, the opening on the left side is formed similarly to the opening 26 on the right side.

The chamber 30 is attached to one end surface in the left-right direction X (a right end surface in FIG. 2) of the module case 24 of the battery module 20 inside the pack case 12, and is thus formed at a part facing the battery module 20. The chamber 30 is an air flow passage that allows air to flow inside, and extends in the front-rear direction Y. A sectional shape of the chamber 30 along a plane orthogonal to the front-rear direction Y is rectangular. The chamber 30 has a box-shaped chamber body 32, and an inlet part 34. The inlet part 34 is formed in a rear end part of the chamber 30 and has a narrower flow passage sectional area because a length in the upper-lower direction Z is smaller than that of the body of the chamber 30. As shown in FIG. 3B, the inlet part 34 is arranged in the rear side (a lower side in FIG. 3B) of the battery module 20, and expands on the battery module 20 side (a left side in FIG. 3B) compared to the chamber body 32. As shown in FIG. 2, a front end (a lower end in FIG. 2) of the chamber body 32 and a rear end (and upper end in FIG. 2) of the inlet part 34 are connected with each other by an intermediate tube part 36 having both upper and lower ends sloped in the upper-lower direction Z. Similarly to the chamber body 32, a sectional shape of the inlet part 34 along a plane orthogonal to the front-rear direction Y is rectangular.

In addition, in the chamber 30, the other side surface of the chamber body 32 in the left-right direction X (the left side surface in FIG. 2) is fixed to one end surface of the module case 24 in the left-right direction X. In the other side surface of the chamber body 32 in the left-right direction X, insertion holes 38 are made at a plurality of positions in the front-rear direction Y. Each of the insertion holes 38 is open towards the opening 26 that is formed in one end part (the right end part of FIG. 2) of the module case 24 in the left-right direction X. Therefore, cooling air inside the chamber 30 is introduced in the module case 24 through the insertion holes 38 and the opening 26, thereby cooling the battery cells 22 (FIG. 1, FIG. 3B) inside the module case 24. Moreover, in a front end part of the chamber 30, a lid part or a chamber sealing part (not shown) is attached, covering a front end part of the flow passage inside the chamber. The chamber 30 is formed from metal such as iron, or resin. The first openings 61 of the connectors 60a, 60b are connected with the inlet parts 34 of the chambers 30, while being sealed by the first sealing members 70, respectively.

Back to FIG. 1, the first cooling duct 40 and the second cooling duct 50 are arranged outside the pack case 12 (FIG. 5), and attached separately on the left and right sides of an outer surface of the rear end wall part 14c of the pack case 12. The first cooling duct 40 works as an air flow passage that sends air into the two chambers 30 that are connected with the two battery modules 20 on the left side, out of the plurality of battery modules 20. The second cooling duct 50 works as an air flow passage that sends air into the three chambers 30 connected with the remaining three battery modules 20 out of the plurality of battery modules 20. In this case, as described later, each of the cooling ducts 40, 50 is joined and fixed to the pack case 12 not through the connectors 60a, 60b (FIG. 5) but with joining means such as clips 84 (FIG. 6). In FIG. 1, each of the cooling ducts 40, 50 is simplified.

The first cooling duct 40 has a duct inlet part 41 provided in an end part on the upstream side (the left end part in FIG. 1), and two divided duct outlet parts 42 (FIG. 3B) provided on the downstream side. FIG. 3B only shows one of the duct outlet parts 42 but the other duct outlet part 42 is the same. In a part of the first cooling duct 40 on the downstream side, where the two duct outlet parts 42 are formed, a side surface facing the pack case 12 is a plane. In a periphery of each the duct outlet parts 42, a tube part 43 having a rectangular section is formed. The tube part 43 projects on the front side (the upper side in FIG. 3B) from a front side surface (an upper surface in FIG. 3B) of the first cooling duct 40.

Figure 5:
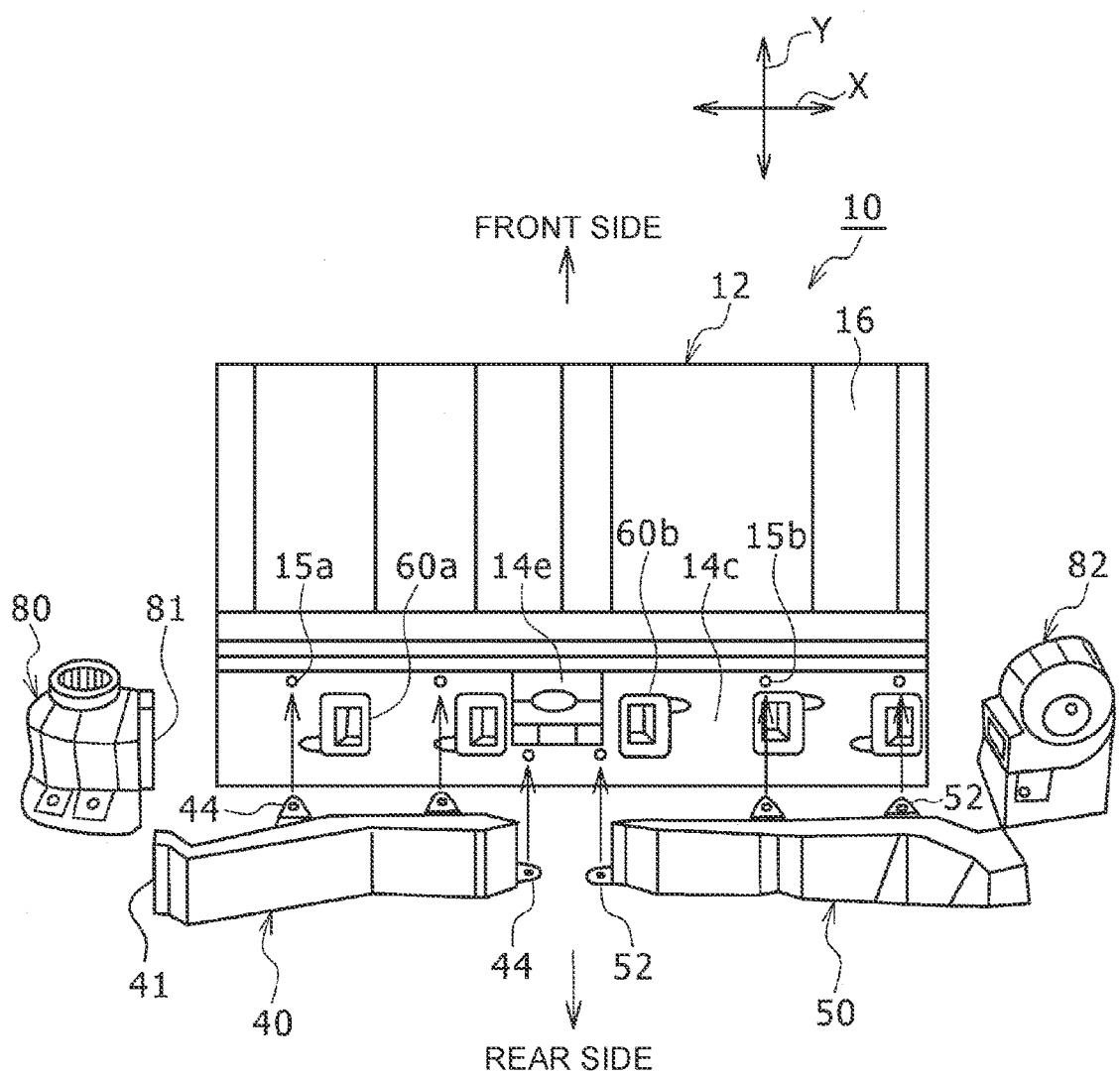
FIG. 5 is a perspective view in which a pack case and the cooling ducts are separated from each other in a state where the lid member is attached to the pack case in FIG. 1.
Figure 6:
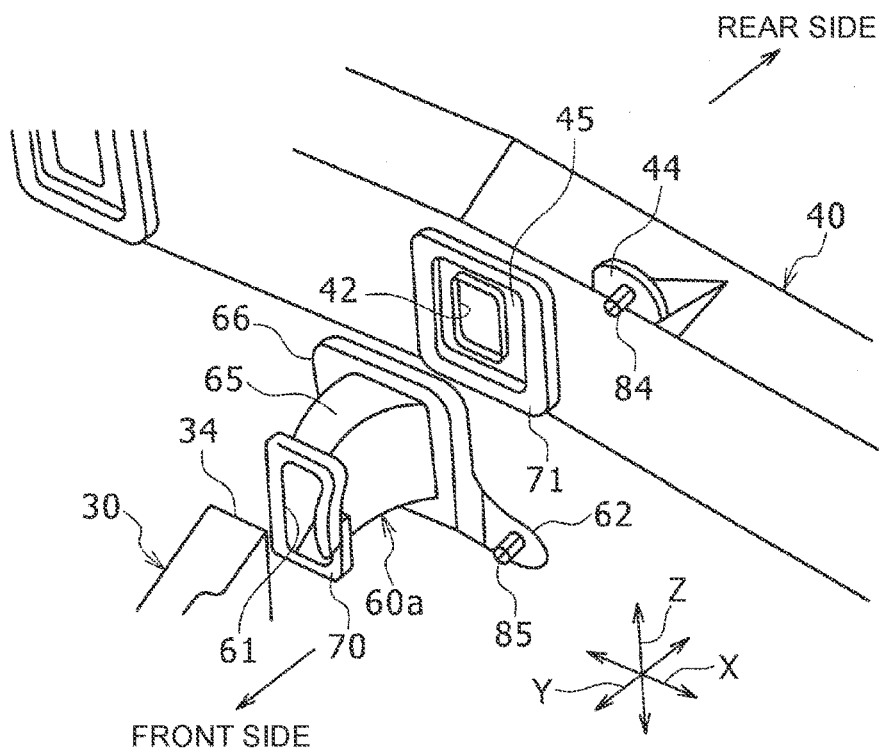
FIG. 6 is a perspective view from the battery module side in a state where the cooling duct, the connector, and the chamber shown in FIG. 3A and FIG. 3B are separated from each other.

FIG. 5 is a perspective view of the pack case 12 and the cooling ducts 40, 50 separated from each other in a state where the lid part 16 is attached to the pack case 12 in FIG. 1. As shown in FIG. 5, a first blower 80 and a second blower 82 are arranged on both sides in the left-right direction X, respectively, outside the pack case 12 near the rear end wall part 14c. The first blower 80 and the second blower 82 are fixed to a vehicle body. Further, an exhaust port 81 of the first blower 80 is connected with the duct inlet part 41 of the first cooling duct 40.

Fixing plate parts 44 are fixed at two positions in an upper end part of a downstream part (a right side part in FIG. 5) of the first cooling duct 40 and also in a lower end part of a downstream end part of the first cooling duct 40, projecting upward and to the right. Each of the fixing plate parts 44 has a hole. In the hole of each of the fixing plate parts 44, the push rivet-shaped clip 84 (FIG. 6) serving as the first joining means is inserted, and a tip part of the clip 84 is inserted in a clip hole 15a (FIG. 5) formed in the rear end wall part 14c of the pack case 12, and fixed in a spread state. Because of this, the first cooling duct 40 is joined and fixed to the rear end part of the pack case 12 without using the later-described connectors 60a. The first joining means may be bolts and nuts, and so on. An intermediate part of the first cooling duct 40 in the longitudinal direction is gradually sloped downwardly from the downstream end part to the upstream side.

The second cooling duct 50 has a duct inlet part 51 provided in an upstream end part (a right end part in FIG. 1), and three branched duct outlet parts (not shown) provided on the downstream side. The duct outlet parts of the second cooling duct 50 are similar to the duct outlet parts 42 (FIG. 3B) of the first cooling duct 40. In a downstream part (a left part in FIG. 1) of the second cooling duct 50, where the three duct outlet parts 42 are formed, a side surface facing the pack case 12 is a plane.

An exhaust port 83 of the second blower 82 (FIG. 5) is connected with the duct inlet part 51 of the second cooling duct 50. Fixing plate parts 52 are fixed at two positions in an upper end part of a downstream part (a left part in FIG. 5) of the second cooling duct 50 and also in a lower end part of a downstream end part of the second cooling duct 50, projecting upward and to the left. Each of the fixing plate parts 52 has a hole. Similarly to the first cooling duct 40, in the second cooling duct 50, a clip (not shown) serving as the first joining means is inserted in the hole of each of the fixing plate parts 52, and a tip part of the clip is inserted in and fixed to a clip hole 15b (FIG. 5) formed in the rear end wall part 14c of the pack case 12. Thus, the second cooling duct 50 is joined and fixed to the rear end part of the pack case 12 without using the connectors 60b.

FIG. 6 is a perspective view from the battery module 20 side in a state where the first cooling duct 40, the connector 60a, and the chamber 30 are separated from each other. In the first cooling duct 40, each of the duct outlet parts 42 is connected with the inlet part 34 of the chamber 30 arranged inside the pack case 12 through the connector 60a in a state where each of the duct outlet parts 42 is fixed to the pack case 12 (FIG. 5). Thus, each of the connectors 60a communicates the first cooling duct 40 and the chamber 30 with each other as an air flow passage. Further, as the first cooling duct 40 is pressed against the connectors 60a through the later-described second sealing members 71 (FIG. 6), the connectors 60a connect the first cooling duct 40 and the pack case 12 with each other.

Similarly to the first cooling duct 40, the second cooling duct 50 shown in FIG. 5 is also connected with the inlet parts of the corresponding chambers 30. The structure in which the second cooling duct 50 is connected with the chambers 30 is similar to the structure that connects the first cooling duct 40 and the chambers 30 with each other. Therefore, explanation is given mainly about the connectors 60a and the chambers 30 that are connected with the first cooling duct 40.

Figure 7:
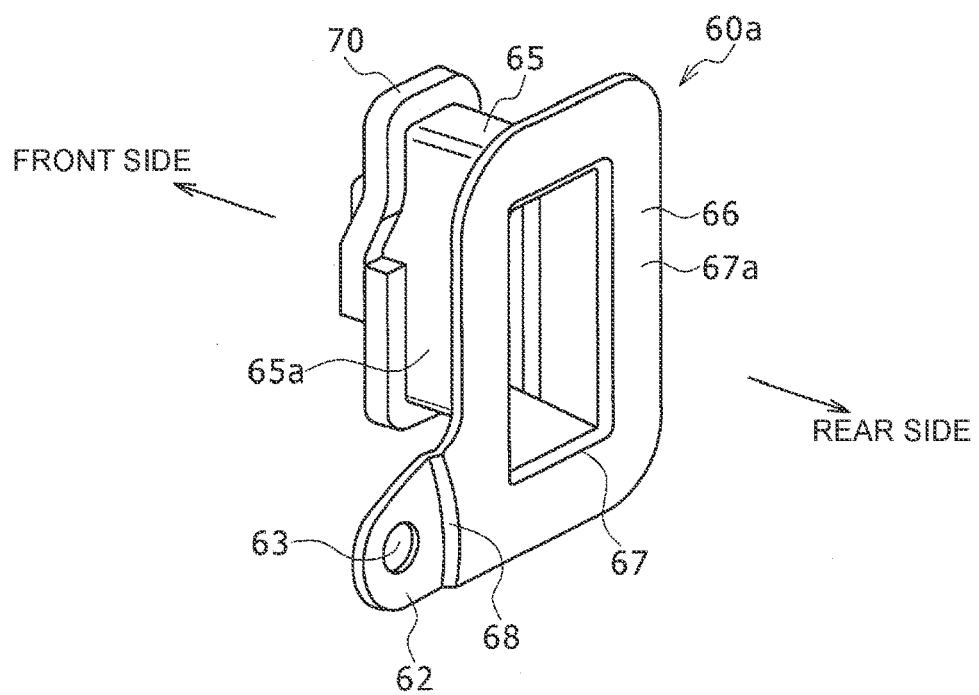
FIG. 7 is a perspective view of the connector shown in FIG. 6, seen from the opposite direction to that in FIG. 6.
Figure 8:
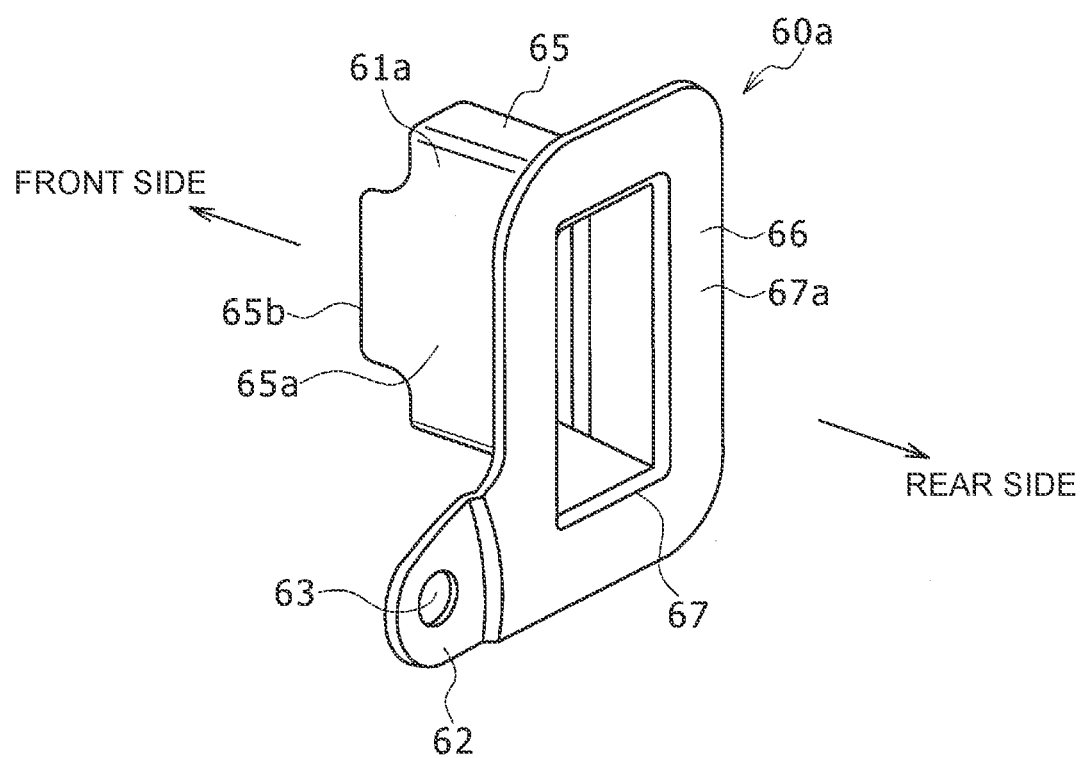
FIG. 8 is a perspective view in which a first sealing member is removed from the connector shown in FIG. 7.
Figure 9:
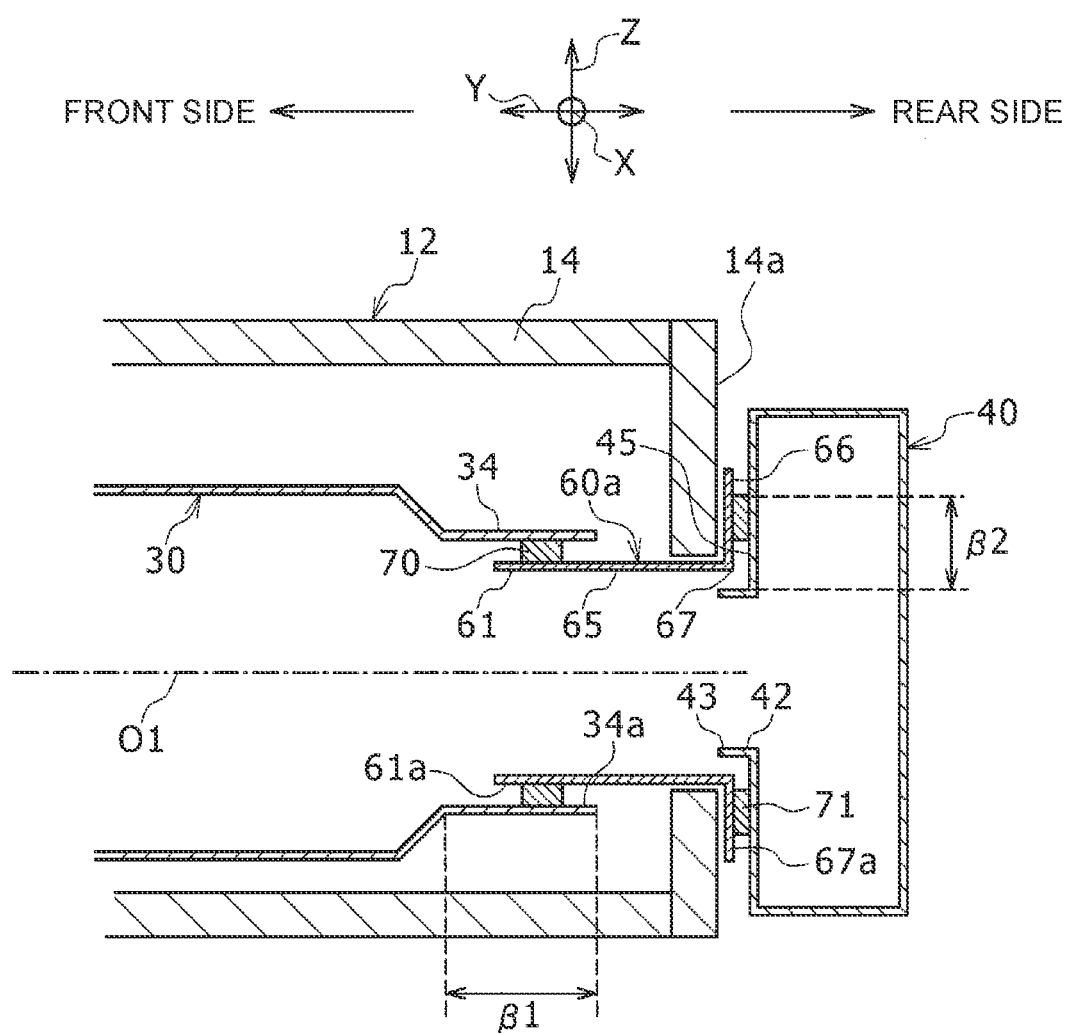
FIG. 9 is a sectional view taken along the line B-B in FIG. 3B.

FIG. 7 is a perspective view of the connector 60a seen from the opposite direction to that in FIG. 6. FIG. 8 is a perspective view in which the first sealing member is removed from the connector 60a. FIG. 9 is a sectional view taken along the line B-B in FIG. 3B. The connector 60b (FIG. 4) connected with the second cooling duct 50 has a similar configuration as that of the connector 60a connected with the first cooling duct 40 except a position of a case-fixing projecting part 62 having a later-described clip insertion hole 63.

The connector 60a shown in FIG. 7 and FIG. 8 includes a tube part 65 and a flange 66 formed in a rear end part of the tube part 65. A front end part (a left end part in FIG. 7) of the tube part 65 has a rectangular tube shape, and, as shown in FIG. 3B, a part of the tube part 65 near the flange 66 on a first blower side (the left side in FIG. 3B) is gradually sloped and the flow passage expands to the first blower side towards the flange 66. As shown in FIG. 7 and FIG. 8, in a tip part of a wall part 65a on the first blower side (the left side in FIG. 7, FIG. 8) included in the tube part 65, a projection 65b projecting in the front-rear direction is formed.

The connector 60a includes the rectangular tube-shaped first opening 61 formed in the front end part of the tube part 65, a rectangular-shaped second opening 67 that is a rear end part of the tube part 65 and formed on an inner side of the flange 66, and a first sealing surface 61a and a second sealing surface 67a. The first opening 61 is connected with the rectangular tube-shaped inlet part 34 of the chamber 30 in a state of being sealed by the first sealing member 70. The second opening 67 is connected with the duct outlet part 42 of the first cooling duct 40 in a state of being sealed by the later-described second sealing member 71 (FIG. 6).

Further, in the tube part 65, the first sealing surface 61a is a rectangular tube-shaped surface, which is formed in a peripheral part of the first opening 61 and parallel to an axis direction (the left-right direction in FIG. 9) of the first opening 61. The first sealing surface 61a faces a chamber inlet surface 34a through the first sealing member 70. The chamber inlet surface 34a is a tube-shaped surface, which is formed on an inner side of a peripheral part of the inlet part 34 of the chamber 30. Specifically, the chamber inlet surface 34a is a tube-shaped surface having a rectangular sectional shape on the inner side of the inlet part 34, and faces an outer side of the first sealing surface 61a. As shown in FIG. 3B, the first sealing surface 61a is connected with the chamber inlet surface 34a through the rectangular shaped first sealing member 70. Thus, the first opening 61 is connected with the inlet part 34 in a state of being sealed by the first sealing member 70.

As shown in FIG. 7, the first sealing member 70 is wound around and stack on an outer circumferential surface of the front end part of the tube part 65. The first sealing member 70 is formed by bending a linear member having a rectangular sectional shape into a rectangular shape and winding the linear member on a whole circumference of the tube part 65. Then, both ends of the linear member are overlapped in the axis direction of the tube part 65, and a part of the overlapped portion is arranged on an outer side of the projection 65b. The first sealing surface 61a and the inlet part 34 of the chamber 30 have almost the same central axis O1 (FIG. 9). Then, between an outer circumferential surface of the first sealing surface 61a and an inner circumferential surface of the inlet part 34 of the chamber 30, an almost uniform ring-shaped gap is formed in the whole circumference. Thus, the first sealing member 70 prevents air leakage between the connector 60a and the chamber 30. The first sealing member 70 is made of rubber or elastic resin. For example, the first sealing member 70 is made of ether-based polyurethane resin, which is soft and has a low density, and formed by foaming. A thickness of the first sealing member 70 in a direction orthogonal to the circumferential direction of first sealing member 70 is specified appropriately in order to prevent air leakage from a periphery of the first sealing member 70 in a case where corner parts of the first sealing member 70 become thinner than the remaining part. The first sealing member 70 may be, for example, rubber sponge. The first sealing member 70 having an O-sectional shape may also be used. The first sealing member 70 has a function of absorbing variation in shape and assembly of parts in the front-rear direction Y of a vehicle.

The second sealing surface 67a is a plane that is formed in the whole circumference of a rear surface (the left surface in FIG. 9) of the flange 66 so as to surround the second opening 67. The rear surface of the flange 66 is a plane along a virtual plane including a rim of the second opening 67. Thus, the second sealing surface 67a is a peripheral part of the second opening 67 and is formed in the rear surface of the flange 66.

The second sealing surface 67a faces a duct outlet surface 45, which is formed in a peripheral part of the duct outlet part 42 of the first cooling duct 40, through the second sealing member 71 (FIG. 9) in the front-rear direction. The duct outlet surface 45 is a plane that is formed in the whole circumference of the peripheral part of the duct outlet part 42 of the first cooling duct 40 so as to surround the duct outlet part 42. As shown in FIG. 9, the second sealing surface 67*a* is connected with the duct outlet surface 45 through the rectangular second sealing member 71. Similarly to the first sealing member 70, the second sealing member 71 is made from rubber or elastic resin. As shown in FIG. 6, the second sealing member 71 is adhered to the duct outlet surface 45 of the first cooling duct 40 so as to surround the duct outlet part 42. For example, a sectional shape of the second sealing member 71 along a plane orthogonal to the circumferential direction is rectangular. The second sealing member 71 is made of rubber or elastic resin. The second sealing member 71 may be, for example, rubber sponge similar to the first sealing member 70. Therefore, the second opening 67 (FIG. 9) of the connector 60*a* is connected with the duct outlet part 42 in a state of being sealed by the second sealing member 71. The rear surface of the flange 66 of the connector 60*a* and a front surface around the duct outlet part 42 of the first cooling duct 40 are generally parallel to one another. Therefore, between the rear surface of the flange 66 and the front surface around the duct outlet part 42, a generally uniform gap is formed in the whole circumference of a ring-shaped part along the second sealing member 71. Then, the second sealing member 71 is arranged around the duct outlet part 42 of the first cooling duct 40, and the second sealing member 71 is set to be larger than an outer rim of the duct outlet part 42. The second sealing member 71 has a function of absorbing variation in shape and assembly of parts in the upper-lower direction Z and the left-right direction X of a vehicle.

Further, the second sealing surface 67*a*, which is a plane of the connector 60*a*, is orthogonal to an axis direction of a tube (the left-right direction in FIG. 9) made of the first sealing surface 61*a* that is a tube-shaped surface.

As shown in FIG. 7 and FIG. 8, the case-fixing projecting part 62 is formed in one of corners of the flange 66. The case-fixing projecting part 62 is arranged on a front side of the second sealing surface 67*a* (the left side in FIG. 7, FIG. 8) through a step part 68 and connected so as to extend in the left-right direction. The clip insertion hole 63 is formed in the case-fixing projecting part 62.

As shown in FIG. 4, the case-fixing projecting part 62 of the connector 60*a* is fixed to the rear surface of the case body 14 of the pack case 12 by a clip 85, which is second joining means, inserted in the clip insertion hole 63. Similarly to the clip 84 shown in FIG. 6, the clip 85 has a push rivet shape. The second joining means may be a bolt and a nut, and so on. The case-fixing projecting part 62 is arranged on the front side (the upper side in FIG. 4) of the flange 66 of the connector 60*a*. Therefore, a gap is formed between the flange 66 of the connector 60*a* and the rear surface of the pack case 12. Hence, in the connector 60*a*, inclination of the connector 60*a* with respect to the pack case 12 is permitted within a deformable range of the step part 68 that is a joining part between the case-fixing projecting part 62 and the flange 66.

In the foregoing battery pack 10, as the blowers 80, 82 are driven, air is sent to the cooling ducts 40, 50 from the blowers 80, 82, respectively, and then supplied to the plurality of chambers 30 through the connectors 60*a*, 60*b*. For example, as shown by an arrow α in FIG. 3B, air flows in the first cooling duct 40, the connector 60*a*, and the chamber 30, in this order. Then, air is sent to a plurality of positions in the battery module 20 in the front-rear direction from the chamber 30 through the plurality of insertion holes 38. Air that has flown in the battery module 20 is brown outside the battery module 20 while cooling the battery cells 22. Air inside the pack case 12 is brown outside through the exhaust hole 14*e* in the rear end wall part 14*c* of the pack case 12. Thus, each of the battery modules 20 is cooled.

Also, the cooling ducts 40, 50 are connected with the chambers 30 through the connectors 60*a*, 60*b* and the sealing members 70, 71, respectively. The first openings 61 of the connectors 60*a*, 60*b* are connected with the chambers 30 through the first sealing members 70, respectively. The second openings 67 of the connectors 60*a*, 60*b* are connected with the cooling ducts 40, 50 through the second sealing members 71, respectively. Because of this, even when the cooling ducts 40, 50 and the chambers 30 have large variation in shape or assembly, the sealing members 70, 71 are able to absorb the variation in connected parts of the cooling ducts, the connectors, and the chambers. For example, as shown in FIG. 9, even when an end of the first opening 61 of the connector 60*a* moves in the front-rear direction Y with respect to the chamber inlet surface 34*a* of the chamber 30 within the range of an arrow β1 in FIG. 9, the first sealing member 70 is able to ensure sealing performance of the first sealing surface 61*a*. Then, a front end part of the connector 60*a* is simply inserted in the inlet part 34 of the chamber 30, and the connector 60*a* is not directly joined and fixed to the chamber 30. Therefore, when the connector 60*a* is assembled to the chamber 30, variation in the front-rear direction Y is absorbed.

Even when the second opening 67 of the connector 60*a* moves in the upper-lower direction Z with respect to the duct outlet surface 45 of the first cooling duct 40 within the range of an arrow β2 in FIG. 9, the second sealing member 71 is able to ensure sealing performance of the second sealing surface 67*a*. Then, since the connector 60*a* is not directly joined and fixed to the first cooling duct 40, variation in the upper-lower direction Z is absorbed when the first cooling duct 40 is fixed to the pack case 12 while being pressed against the connector 60*a*. Then, it is also possible to absorb variation in a direction along the second sealing surface 67*a* other than the upper-lower direction. Thus, even when each variation is large, it is possible to prevent air leakage from happening in connected parts of the sealing surfaces 61*a*, 67*a* of the connector 60*a*, thereby restraining deterioration of cooling performance of the battery pack structure.

Further, the second sealing surface 67*a* is orthogonal to the axis direction of the tube made of the first sealing surface 61*a* of the connector 60*a*. Therefore, even when the cooling duct and the chamber have large variation in the front-rear direction Y, serving as a first direction parallel to the first sealing surface 61*a*, and a second direction that is parallel to the second sealing surface 67*a* and orthogonal to the front-rear direction, it is possible to absorb variation in these two directions. For example, as the second direction parallel to the second sealing surface 67*a*, there is the left-right direction X or the upper-lower direction Z, and variation in any of the front-rear direction Y, the left-right direction X, and the upper-lower direction Z is absorbed. In this regard, it is possible to restrain deterioration of cooling performance.

An upstream end of the first cooling duct 40 is connected with the first blower 80, and an upstream end of the second cooling duct 50 is connected with the second blower. Then, the cooling ducts 40, 50 are connected with the chambers 30 through the connectors 60*a*, 60*b*, the first sealing members 70, and the second sealing members 71, respectively. Since the cooling ducts 40, 50 are separate members from the connectors 60*a*, 60*b*, it is possible to connect the cooling ducts 40, 50 with corresponding blowers 80, 82 and chambers 30, respectively, after connecting the chambers 30 to the connectors 60*a*, 60*b*, respectively. Thus, it is not necessary to carry out work for connecting one part of the cooling duct to each of the blowers 80, 82 while inserting the other part of the cooling duct into the pack case 12. Hence, workability for connecting each of the cooling ducts 40, 50 to the chamber 30 is improved.

Figure 10A:
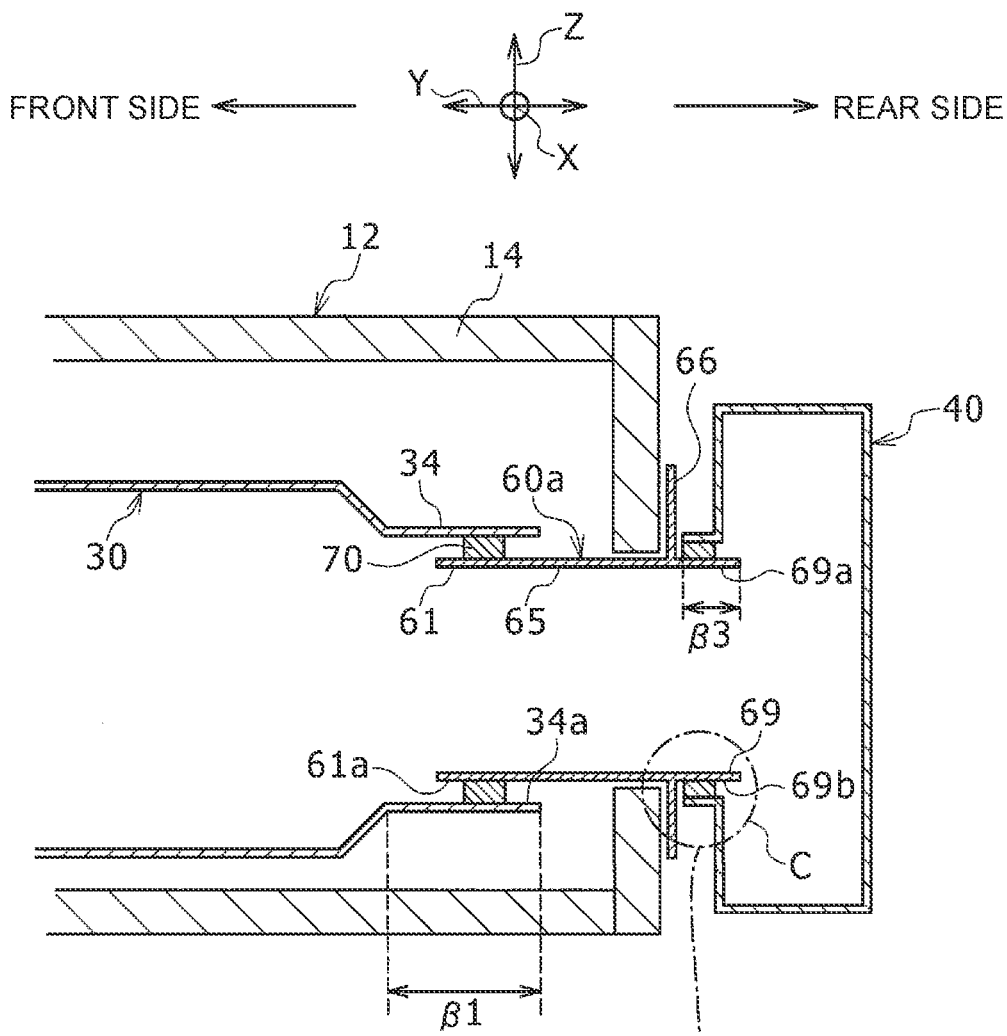
FIG. 10A is a view corresponding to FIG. 9, showing a battery pack structure according to the second embodiment of the disclosure.
Figure 10B:
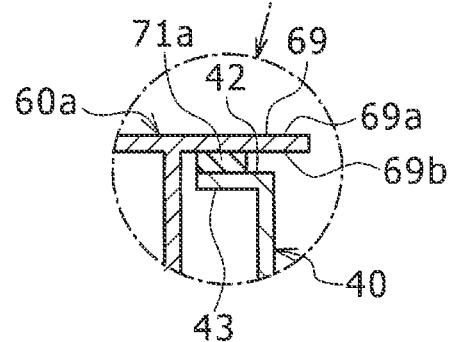
FIG. 10B is an enlarged view of a portion C in FIG. 10B.
Figure 11:
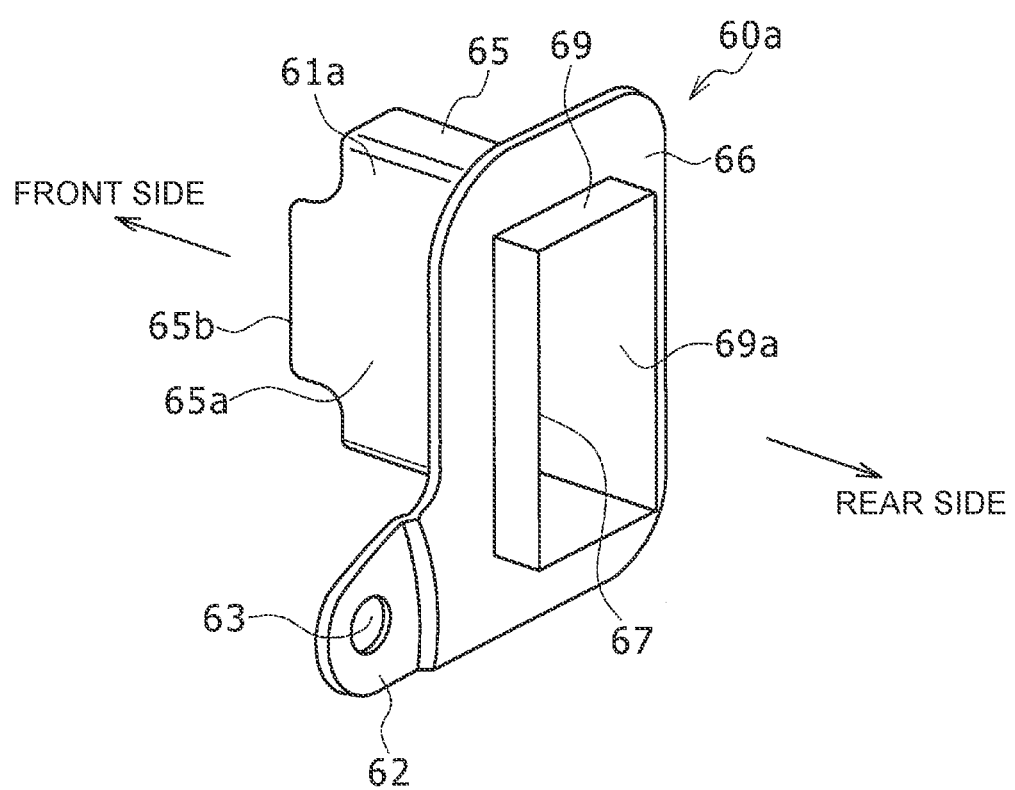
FIG. 11 is a perspective view of a connector taken out from FIG. 10A.

FIG. 10A and FIG. 10B relate to a battery pack according to the second embodiment. FIG. 10A corresponds to FIG. 9. FIG. 10B is an enlarged view of a portion C in FIG. 10A. FIG. 11 is a perspective view of a connector 60a removed from FIG. 10A.

In a configuration shown in FIG. 10A, FIG. 10B, and FIG. 11, a second tube part 69 is formed at the rear of a flange 66 of a connector 60a with reference to the configuration shown in FIG. 1 to FIG. 9. The second tube part 69 has a rectangular tube shape and projects on the opposite side of a tube part 65 on the front side, with respect to the flange 66. As shown in FIG. 10A and FIG. 10B, a second opening 69a having a rectangular sectional shape is formed on an inner side of the second tube part 69. Also, a second sealing surface 69b is formed in an outer circumferential surface of the second tube part 69, which is a peripheral part of the second opening 69a. The second sealing surface 69b is a tube-shaped surface parallel to an axis direction of the second opening 69a (a left-right direction in FIG. 10A).

The second sealing surface 69b of the second tube part 69 is connected with an inner side of a tube part 43 of a first cooling duct 40 through a second sealing member 71a having a rectangular tube shape. To be specific, the second sealing surface 69b and the tube part 43 of the first cooling duct 40 have generally the same central axis. Then, between the outer circumferential surface of the second sealing surface 69b and an inner circumferential surface of the tube part 43, a generally uniform gap is formed across the whole circumference. Thus, the second sealing member 71a prevents air leakage between the connector 60a and the first cooling duct 40.

In a state where the second opening 69a is sealed by the second sealing member 71a, the second opening 69a faces the rectangular tube-shaped inner circumferential surface of the tube part 43, which is formed in a peripheral part of a duct outlet part 42 of the first cooling duct 40. The inner circumferential surface of the tube part 43 is a duct outlet surface. The second opening 69a is connected with the duct outlet part 42 in a state of being sealed by the second sealing member 71a. Since the tube part 43 is fitted to an outer side of the second tube part 69 through the second sealing member 71a, the first cooling duct 40 may not be joined and fixed to a pack case 12 by the first joining means such a clip.

According to the configuration in FIG. 10A, FIG. 10B, and FIG. 11, even when the tube part 43 of the first cooling duct 40 moves in the front-rear direction Y with respect to the second sealing surface 69b of the connector 60a within the range shown by an arrow β3 in FIG. 10A, the second sealing member 71a is able to ensure sealing performance at a connected part with the connector 60a. Therefore, even when each variation in the front-rear direction is large, it is possible to prevent air leakage from happening between the connector 60a and the first cooling duct 40. Therefore, it is possible to restrain deterioration of cooling performance of a battery pack structure. The rest of the configuration and operations are similar to those of FIG. 1 to FIG. 9.

Figure 12:
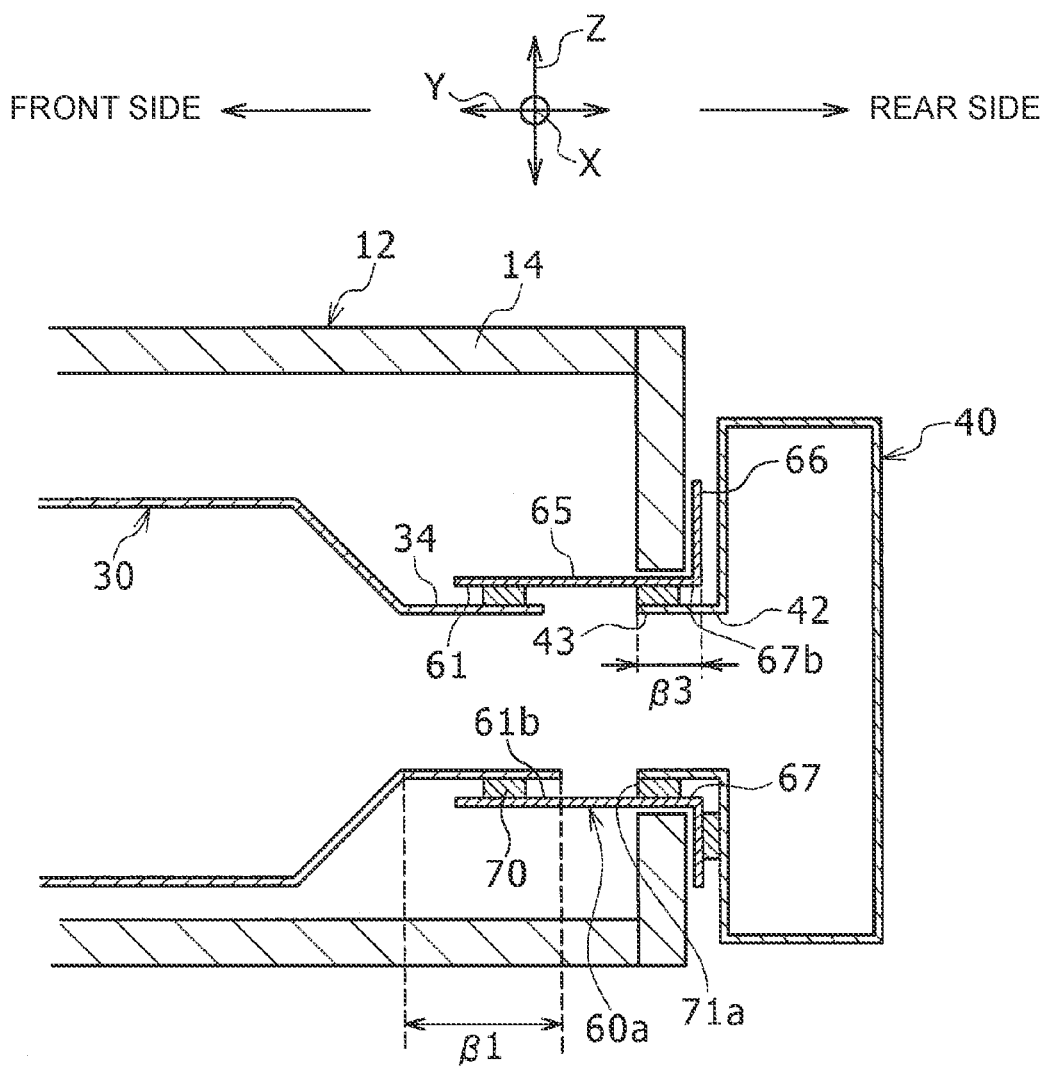
FIG. 12 is a view corresponding to FIG. 9, showing a battery pack structure according to the third embodiment of the disclosure.

FIG. 12 is a view corresponding to FIG. 9 and shows a battery pack according to the third embodiment. In the configuration shown in FIG. 12, an inlet part 34 of a chamber 30 and a tube part 43 of a duct outlet part 42 of a first cooling duct 40 are inserted to inner sides of openings in both ends of a tube part 65 of a connector 60a, respectively, with reference to the configuration shown in FIG. 1 to FIG. 9. A rectangular tube-shaped first sealing surface 61b is formed in an inner circumference side of a first opening 61 of the tube part 65 of the connector 60a. The first sealing surface 61b and the rectangular tube-shaped inlet part 34 of the chamber 30 have generally the same central axis. Further, between an outer circumferential surface of the inlet part 34 of the chamber 30 and the first sealing surface 61b, a generally uniform ring-shaped gap is formed in the whole circumference. Then, a first sealing member 70 is arranged between the outer circumferential surface of the inlet part 34 and the first sealing surface 61b.

Further, a rectangular tube-shaped second sealing surface 67b is formed in an inner circumference side of a second opening 67 of the connector. The second sealing surface 67b and the tube part 43 of the first cooling duct 40 have generally the same central axis. Further, between an outer circumferential surface of the tube part 43 of the first cooling duct 40 and the second sealing surface 67b, a generally uniform ring-shaped gap is formed in the whole circumference. Then, a rectangular tube-shaped second sealing member 71a is arranged between the outer circumferential surface of the tube part 43 and the second sealing surface 67b. The first sealing member 70 prevents air leakage between the chamber 30 and the connector 60a, and the second sealing member 71a prevents air leakage between the first cooling duct 40 and the connector 60a.

In the above-mentioned configuration, similarly to that shown in FIG. 1 to FIG. 9, deterioration of cooling performance is restrained even when the first cooling duct 40 or the chamber 30 has large variation in shape or assembly in the front-rear direction Y. The rest of the configuration and operations are similar to those in FIG. 1 to FIG. 9 or those in FIG. 10A, FIG. 10B, and FIG. 11.

Figure 13:
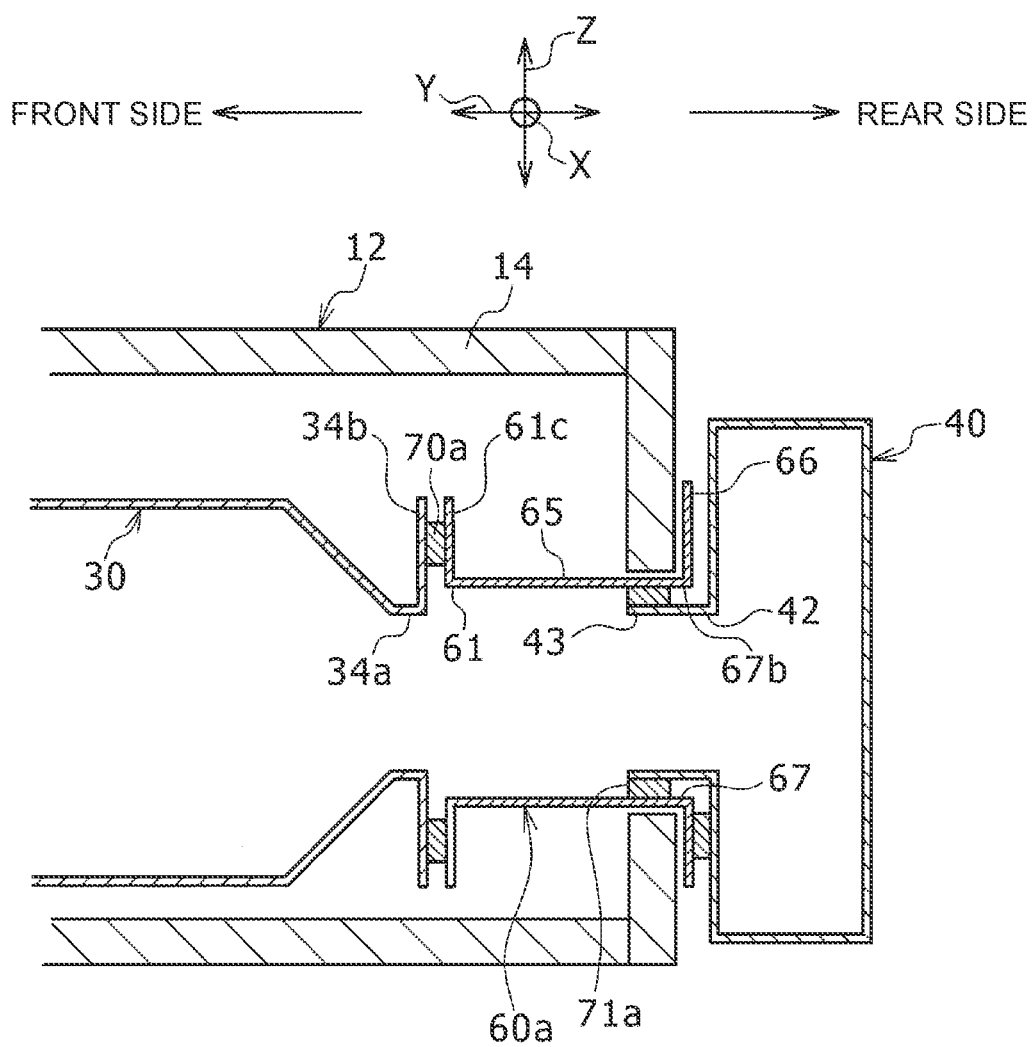
FIG. 13 is a view corresponding to FIG. 9, showing a battery pack structure according to the forth embodiment of the disclosure.

FIG. 13 is a view corresponding to FIG. 9, showing a battery pack according to the forth embodiment. In the structure in FIG. 13, a flange 61c is formed in a peripheral part of a first opening 61 of a connector 60a with reference to the configuration shown in FIG. 12. Then, the flange 61c and a flange 34b formed in an end part of an inlet part 34 of a chamber 30 are connected with each other through a rectangular-shaped first sealing member 70a. A first sealing surface is formed in a front surface (a left surface in FIG. 13) of the flange 61c of the connector 60a. The first sealing surface is a plane along a virtual plane including a rim of the first opening 61. The first sealing member 70a is arranged between a rear surface (a right-side surface in FIG. 13) of the flange 34b of the chamber 30, which is a plane positioned on an inlet side, and the first sealing surface. Since a front end part of the connector 60a is pressed against a rear end part of the chamber 30 through the first sealing member 70a, the connector 60a and the chamber 30 are not joined to one another directly by joining means such as a clip. In this case, the connector 60a may be fixed to a pack case 12 on an inner side of the pack case 12 by using a bracket and joining means. Thus, it is possible to absorb variation of the connector 60a and the chamber 30 in the upper-lower direction Z or the left-right direction X. The rest of the configuration or operations are similar to those in FIG. 1 to FIG. 9 or those in FIG. 12.

In the configuration in FIG. 10A and FIG. 10B to FIG. 13, the structure for connecting the first cooling duct 40, the connector 60a, and the chamber 30 is explained. However, a structure for connecting the second cooling duct 50, the connector 60b, and the chamber is formed similarly.

In each of the foregoing examples, the configuration for connecting the two separate cooling ducts 40, 50 to the plurality of chambers 30 is explained. However, a configuration may be such that a single cooling duct is connected to all of the plurality of chambers 30.

In each of the foregoing examples, explanation is given regarding the configuration that, in a case where a sealing surface in a peripheral part of an opening of the connector is a tube-shaped surface, the tube-shaped surface has a rectangular-shaped section. However, the tube-shaped surface may be a cylindrical surface. However, since it is difficult for the cylindrical surface to have high surface accuracy compared to a plane, it is preferred that the tube-shaped surface has a rectangular-shaped section to reduce manufacturing cost. Also, it is more preferred that the tube-shaped surface has a rectangular-shaped section than a cylindrical surface because it is possible to reduce a length in the left-right direction by making the rectangular shape into an oblong that is longer in the upper-lower direction.

What is claimed is:

1. An battery pack structure comprising:
    a battery module including a plurality of battery cells;
    a pack case in which a plurality of the battery modules are housed;
    a plurality of chambers that serves as an air flow passage to each one of the plurality of the battery modules inside the pack case;
    a cooling duct that is arranged outside the pack case and serves as a second air flow passage; and
    a plurality of connectors that connects the cooling duct and the pack case with each other, the plurality of the connectors communicating the plurality of chambers and the cooling duct with each other,
    wherein the cooling duct is connected to the plurality of the connectors,
    wherein each of the plurality of connectors includes a first opening, a second opening, a first sealing surface, and a second sealing surface,
    wherein for each of the plurality of connectors:
    the first opening is connected with an inlet part of a respective one of the plurality of chambers in a state of being sealed by a first sealing member,
    the second opening is connected with an outlet part of the cooling duct in a state of being sealed by a second sealing member,
    the first sealing surface is formed in a peripheral part of the first opening, the first sealing surface facing a chamber inlet surface through the first sealing member, the first sealing surface formed in a shape of a tube or a plane, the chamber inlet surface being formed in a peripheral part of the inlet part, and the chamber inlet surface formed in a same shape of the tube or the plane as the first sealing surface, and
    the second sealing surface is formed in a peripheral part of the second opening, the second sealing surface facing a duct outlet surface through the second sealing member, the second sealing surface formed in a shape of a tube or a plane, the duct outlet surface being formed in a peripheral part of the outlet part, and the duct outlet surface formed in a same shape of the tube or the plane as the second sealing surface.

2. The battery pack structure according to claim 1, wherein
    one of the first sealing surface and the second sealing surface has the tube shape,
    an other one of the first sealing surface and the second sealing surface has the plane shape, and
    the other one of the first sealing surface and the second sealing surface is orthogonal to an axis direction of the tube shape made by the one of the first sealing surface and the second sealing surface.

* * * * *